United States Patent [19]
Kawagoe et al.

[11] Patent Number: 5,515,736
[45] Date of Patent: May 14, 1996

[54] ARRANGEMENT FOR COMPENSATING THERMAL CHARACTERISTICS OF SENSOR

[75] Inventors: Hiroyuki Kawagoe; Susumu Ohta; Junichi Yoshida, all of Wako, Japan

[73] Assignee: Honda Giken Kogyo Kabushiki Kaisha, Tokyo, Japan

[21] Appl. No.: 456,378

[22] Filed: Jun. 1, 1995

[30] Foreign Application Priority Data

Jun. 13, 1994 [JP] Japan .................................. 6-130377

[51] Int. Cl.⁶ .................................................. G01L 3/02
[52] U.S. Cl. ................................ 73/862.333; 73/862.333
[58] Field of Search ...................... 73/862.325, 862.331, 73/862.332, 862.333, 862.623; 324/267.12, 225

[56] References Cited

U.S. PATENT DOCUMENTS

| | | | |
|---|---|---|---|
| 4,448,275 | 5/1984 | Kitagawa et al. | 73/862.331 X |
| 4,872,124 | 10/1989 | Shimizu et al. | 324/225 X |
| 4,876,899 | 10/1989 | Strott et al. | 73/862.331 |
| 4,926,123 | 5/1990 | Redlich | 324/267.12 |
| 4,954,776 | 9/1990 | Husher | 324/207.12 X |
| 4,972,728 | 11/1990 | Yoshimura et al. | 73/862.333 |
| 4,979,399 | 12/1990 | Klauber et al. | 73/862.333 |
| 5,307,690 | 5/1994 | Hanazawa | 73/862.331 X |
| 5,394,760 | 3/1995 | Persson et al. | 73/862.325 X |
| 5,431,063 | 7/1995 | Yasui | 73/862.333 |

FOREIGN PATENT DOCUMENTS 1670362   8/1991   U.S.S.R. ............................ 324/207.12

*Primary Examiner*—Richard Chilcot
*Assistant Examiner*—Elizabeth L. Dougherty
*Attorney, Agent, or Firm*—Armstrong, Westerman, Hattori, McLeland & Naughton

[57] ABSTRACT

An arrangement for compensating the thermal characteristics of a sensor including a core movable from a neutral position in two directions along a line and two detecting coils symmetrically disposed along the line with the neutral position placed at the center of symmetry, in which sensor a change in the inductance of the two detecting coils due to the movement thereof is electrically detected, the arrangement being adapted so that the numbers of wire turns in the two detecting coils are set different to compensate a mechanically produced change in the thermal characteristics of the sensor. The arrangement allows a mechanical positional difference between the detecting coils and the core due to a temperature change to be compensated and an output voltage drift due to a temperature change to be reduced, thus increasing sensor accuracy.

8 Claims, 7 Drawing Sheets

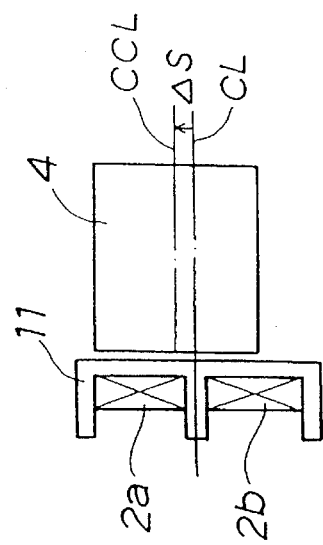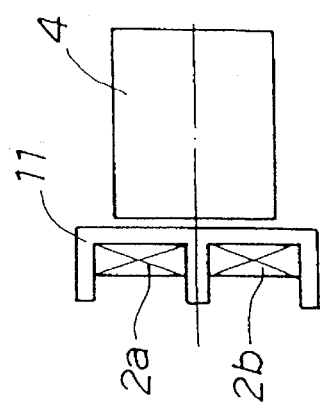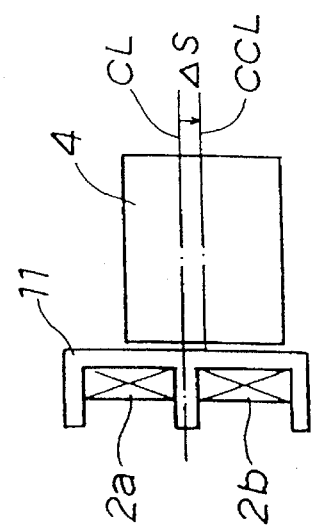

ARRANGEMENT FOR COMPENSATING THERMAL CHARACTERISTICS OF SENSOR

BACKGROUND OF THE INVENTION

1. Field of the Invention

The present invention relates to an arrangement for compensating the thermal characteristics of a sensor that detects displacement, torque, and pressure, using a change in the inductance of detecting coils.

2. Description of the Related Art

The following methods have thus far been available to inhibit a drift of magnetic sensor output voltage due to a temperature change:

1) Materials with nearly the same coefficient of thermal expansion are combined to fabricate the components, i.e., an object to be detected (core) and a detector (detecting coil), of a detecting section, which is one of mechanical factors causing an output voltage drift, so that a relative positional difference between the components may be reduced which is attributable to difference in thermal expansion between them.

2) To reduce the effect of temperature, a differential transformer is used which outputs according to a change in the inductance of the secondary coil due to core displacement, which change is detected as a change in voltage (induced electromotive force) induced by the primary coil.

The applicant has proposed in Japanese Patent Application No. 130363/1994 a steering torque sensor 100 shown in FIG. 10, used in an electrically powered steering system utilizing a change in coil inductance.

The steering torque sensor comprises as follows: An input shaft 101 and an output shaft 102, both of which are made of iron, are internally connected together, using a torsion bar 103, and a cylindrical core 107 is fitted over the input shaft 101 and the output shaft 102. Two detecting coils 105 and 106, supported by a housing 104, are disposed so that the detecting coils surround the core 107, the detecting coil 105 having the same number of wire turns as the detecting coil 106.

In the steering torque sensor 100, the torsion bar 103 undergoes elastic deformation, thus causing the input shaft 101 and the output shaft 102 to be displaced relative to each other, when steering operation provides the input shaft 101 with twisting torque.

The core 107, placed over the input shaft 101 and the output shaft 102, is provided with a longitudinal guide groove (not shown), which receives a pin on the side of the output shaft 102, and is arranged so as to be only movable axially. A slanted groove 108 is formed in a segment of the circumference of the core 107, into which groove a pin 109 of the input shaft 101 is fitted.

The above-described arrangement converts into the axial displacement of the core 107 that of the input shaft 101 and the output shaft 102 relative to each other due to twisting in the direction of rotation. The displacement of the core 107 causes a magnetic change around detecting coils 105 and 106, so that the inductance $L_1$ of the detecting coil 105 and the inductance $L_2$ of the detecting coil 106 change, both coils being vertically placed. The change in inductance is electrically extracted to detect steering torque.

In the above-described art, if measures such as selection of materials with nearly the same coefficient of thermal expansion for the components of a sensor are taken to arrange the sensor so that a relative positional difference may hardly occur, it is difficult to completely eliminate a mechanical positional difference while satisfactory sensor performance is ensured.

In the steering torque sensor 100 shown in FIG. 10, a temperature change causes a relative positional difference between the detecting coil 105, the detecting coil 106, and the core 107. As a result, the inductance $L_1$ of the detecting coil 105 and the inductance $L_2$ of the detecting coil 106 change.

The thermal characteristics of the detecting coils 105 and 106 themselves, magnetic changes (changes in permeability and eddy current loss) due to physical phenomena occurring around the detecting coils 105 and 106, and others also change the inductance $L_1$ of the detecting coil 105 and the inductance $L_2$ of the detecting coil 106.

It is therefore difficult to virtually nullify a drift, caused by such mechanical and electromagnetic properties, of voltage occurring as sensor output.

The present invention was made to correct the above-described disadvantages of the prior art.

It is an object of the present invention to provide an arrangement for compensating the thermal characteristics of a sensor, arrangement that can reduce an output voltage drift due to a temperature change to cover sensors with increased accuracy.

It is another object of the present invention to provide an arrangement for compensating the thermal characteristics of a sensor, arrangement that allows a stable, accurate steering torque sensor, committing few errors, for use in an electrically powered steering system to be obtained.

SUMMARY OF THE INVENTION

The basic concept of the present invention comprises an arrangement for compensating the thermal characteristics of a sensor including a core movable from a neutral position in two directions along a line and two detecting coils symmetrically disposed along the line with the neutral position placed at the center of symmetry, in which sensor a change in the inductance of the two detecting coils due to the movement thereof is electrically detected, the arrangement being adapted so that the numbers of wire turns in the two detecting coils are set different to compensate a mechanically produced change in the thermal characteristics of the sensor.

An output voltage drift caused by mechanical relative positional difference between the detecting coils and the core due to a temperature change can be offset by winding different numbers of wire turns around the two detecting coils. For example, the number of wire turns in one of the two detecting coils is set to N1+α, and that of wire turns in the other is set to N1. This setting enables an output voltage drift caused by mechanical relative positional difference between the detecting coils and the core due to a temperature change to be offset to significantly reduce the output voltage drift.

Mechanical relative positional difference between the detecting coils and the core due to thermal characteristics and magnetic reluctance changes (changes in permeability and eddy current loss) can also be reduced by winding different numbers of wire turns around the two detecting coils.

Accordingly, a sensor output voltage drift is minimized, and thus a sensor is provided which accompanies little output voltage drift attributable to temperature changes and which can stably detect torque with accuracy.

Using such a sensor as a steering torque sensor for an electrically powered steering system allows mechanical relative positional differences between the detecting coils and the core due to thermal characteristics and magnetic reluctance changes to be reduced. As a result, a sensor output voltage drift is minimized, and thus a sensor is provided which accompanies little output voltage drift attributable to temperature changes or the like and which can stably detect steering torque with accuracy.

Thus a stable, accurate steering torque sensor committing few errors can be obtained. Moreover, such a sensor can be made a reality with an simple arrangement in which different numbers of wire turns are wound around two detecting coils.

BRIEF DESCRIPTION OF THE SEVERAL VIEWS OF THE DRAWING

FIG. 3 is an illustrative view showing mechanical positional difference between a core and detecting coils due to a temperature change to a high level;

FIG. 4 is an illustrative view showing mechanical positional difference between a core and detecting coils due to a temperature change to a normal level;

FIG. 5 is an illustrative view showing mechanical positional difference between a core and detecting coils due to a temperature change to a low level;

DETAILED DESCRIPTION

Referring now to the attached drawings, a preferred embodiment of the present invention is described in detail.

Figure 1:
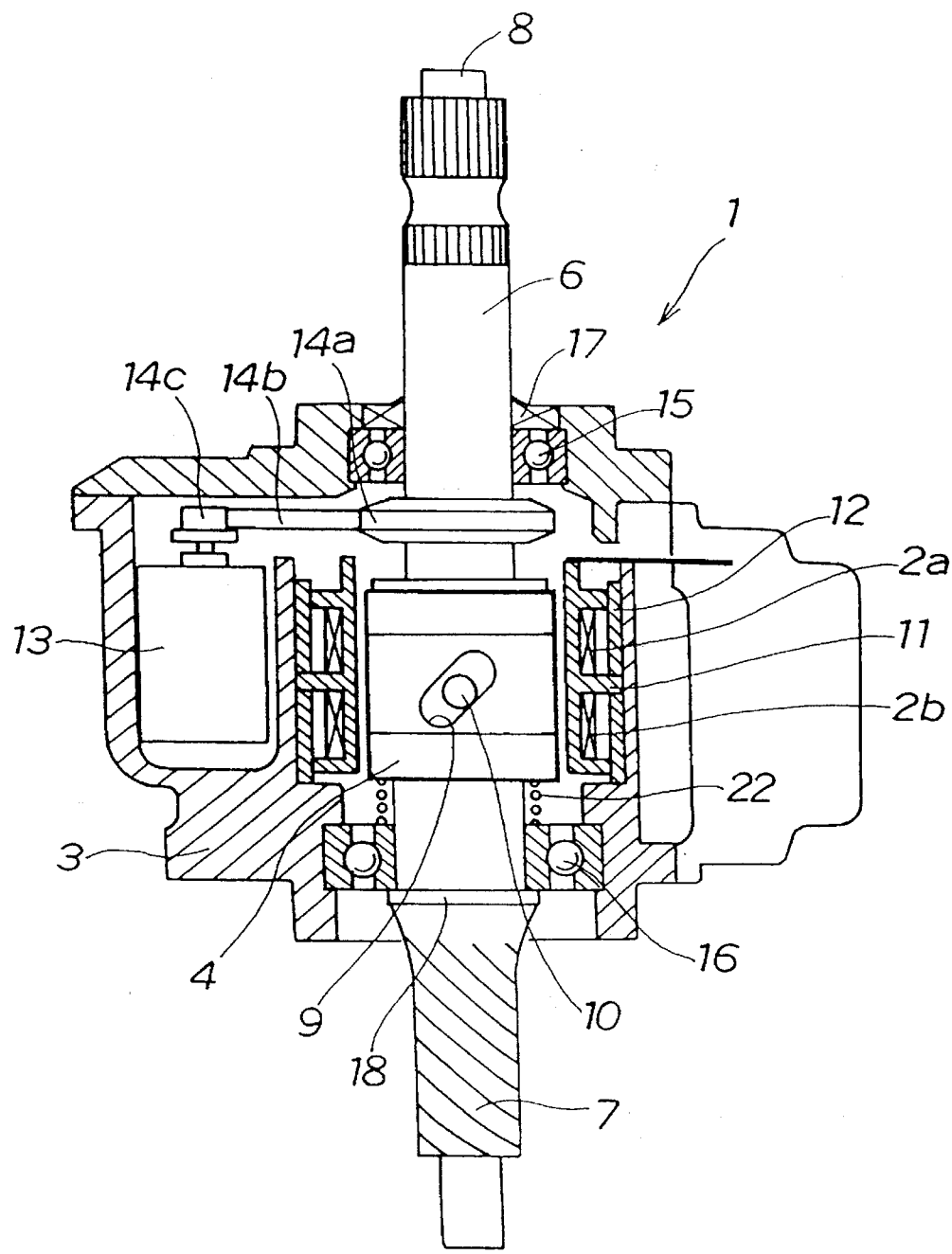
FIG. 1 is a longitudinal cross-sectional view of a steering torque sensor employing an arrangement for compensating the thermal characteristics of a sensor.
Figure 2:
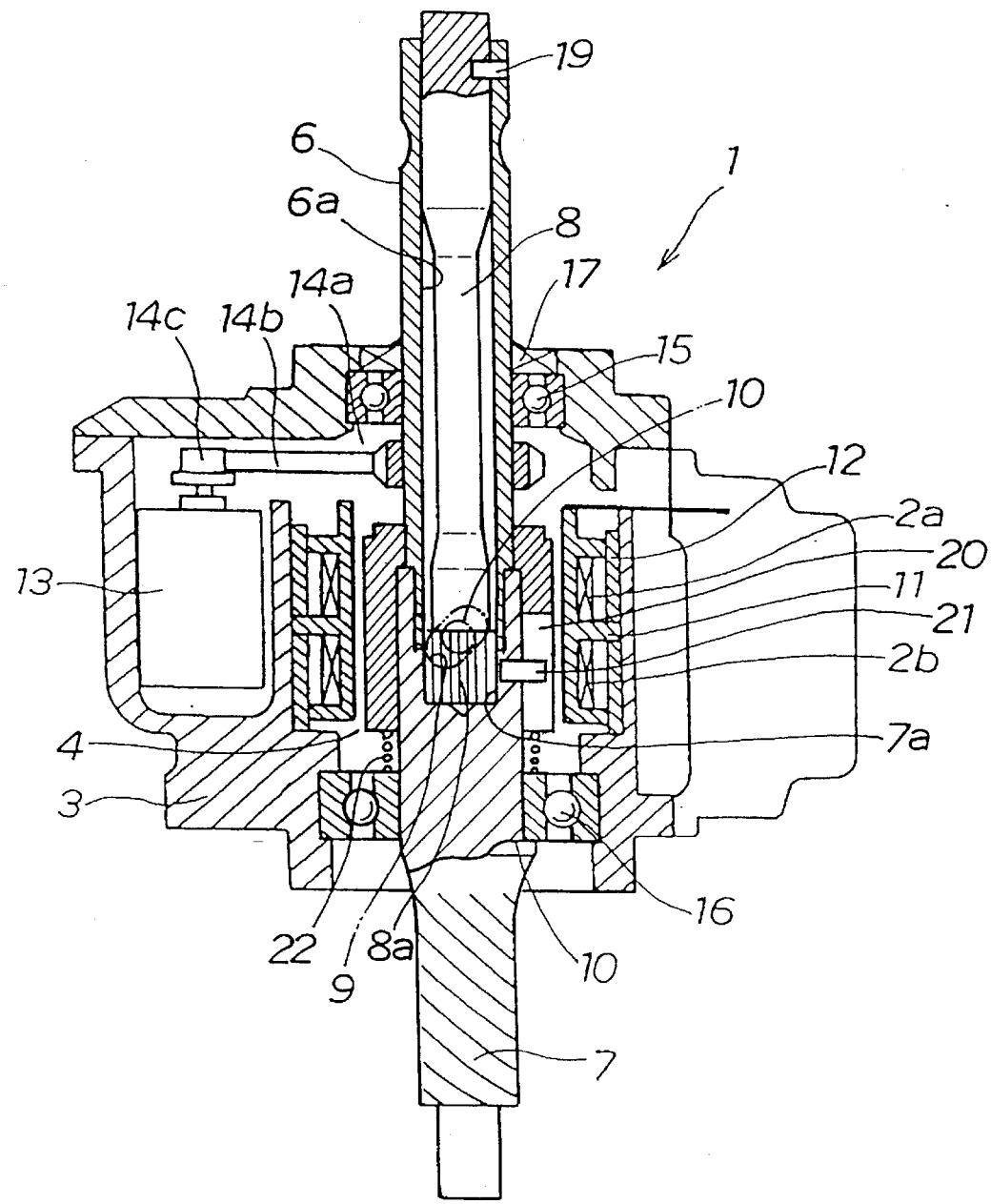
FIG. 2 is an illustrative cross-sectional view including an input shaft, an output shaft, and a core of the steering torque sensor of FIG. 1.

FIG. 1 is a longitudinal cross-sectional view of a steering torque sensor 1, and FIG. 2 is an illustrative longitudinal cross-sectional view including an input shaft, an output shaft, and a core, wherein an arrangement is schematically shown.

The steering torque sensor 1 in the preferred embodiment is illustrated as implemented in an electrically powered steering system.

The steering torque sensor 1 includes two detecting coils 2a and 2b, a housing 3 externally supporting the detecting coils 2a and 2b, a cylindrical core 4 made of a non-magnetic metal material, for example, aluminum, providing the detecting coils 2a and 2b with a magnetic change, and a rectifier circuit (not shown) outputting a change in the inductance of the detecting coils 2a and 2b as a change in the transient response voltage of an LR circuit. The applicant has proposed the rectifier circuit in Patent Application No. 130539/1994.

The two detecting coils 2a and 2b are disposed symmetrically in the direction of the movement of the core 4 (axially in FIG. 1), which direction is described later, with a neutral position placed at the center of symmetry.

The core 4 may be non-magnetic or magnetic.

In the steering torque sensor 1, an input shaft 6 and an output shaft 7 are connected together by a torsion bar 8 vertically running through a hollow section 6a in the input shaft 6.

The input shaft 6, connected to a steering handle (not shown), is rotated by operating a steering handle. The output shaft 7 having a pinion therearound is engaged with a rack (not shown) to horizontally drive it, thereby pulling or pushing a knuckle arm (not shown) to operate a steering wheel.

The torsion bar 8 is connected at its upper end by a pin 19 to the upper end of the input shaft 6 and is also connected at its lower end via a spline 8a to a spline groove 7a provided in the upper section of the output shaft 7.

Thus, when steering torque is applied to the input shaft 6, the steering torque is transmitted to the torsion bar 8, and the input shaft 6 and the output shaft 7 undergo twisting displacement relative to each other because the torsion bar 8 is connected with the output shaft 7.

The core 4 and the output shaft 7 are provided with a longitudinal guide groove 20 and a pin 21, respectively, and the pin 21 and the groove 20 are fitted together. On the other hand, the core 4 and the input shaft 6 are provided with a slanted groove 9 and a pin 10, respectively, and the slanted groove 9 and the pin 10 are fitted together.

The longitudinal guide groove 20 in the core 4 and the pin 21 of the output shaft 7 are fitted together, and so are the slated groove 9 and the pin 10 of the input shaft 6 to displace the core 4 axially according to the relative twisting displacement. The magnitude of the displacement of the core 4 is directly proportional to steering torque.

A housing 3, formed from aluminum, is arranged to support a coil bobbin 11, around which the detecting coils 2a and 2b are installed, via a yoke 12 and surround the input and output shafts 6 and 7.

In FIGS. 1 and 2, numeral 13 designates a tachometer generator detecting the speed of rotation via a gear 14a, timing belt 14b, and a gear 14c; numeral 15, a bearing between the input shaft 6 and the housing 3; numeral 16, a bearing installed between the output shaft 7 and the housing 3; numeral 17, a dust seal; numeral 18, a clamp ring; and numeral 22, a spring pushing the core 4 upward.

The number of wire turns in the detecting coil 2a is set differently from that of wire turns in the detecting coil 2b installed around the same coil bobbin 11 as the detecting coil 2a, the former being N1+α and the latter being N1.

The operation of the steering torque sensor 1 is described below.

When steering torque is applied to the input shaft 6, the torsion bar 8 is twisted, and thus the input shaft 6 and the output shaft 7 undergo twisting displacement relative to each other. The core 4, fitted over the input shaft 6 and the output shaft 7, is axially displaced according to the relative twisting displacement through engagement between the slanted groove 9 and engagement between the longitudinal guide groove 20 and the pin 21, the magnitude of which is directly proportional to steering torque.

The displacement of the core 4 causes magnetic changes around the detecting coils 2a and 2b. As a result, the inductance $L_1$ of the detecting coil 2a and the inductance $L_2$ of the detecting coil 2b change so that one of the inductances $L_1$ and $L_2$ is increased and the other is reduced. A rectifier circuit can detect changes in the inductances $L_1$ and $L_2$ as those in steering torque.

In the steering torque sensor 1, mechanical positional difference between the detecting coils 2a and 2b and the core 4 occurs as shown in FIGS. 3 to 5 because materials from which the detecting coils 2a and 2b, the housing 3, the core 4, the coil bobbin 11, and other components are formed differ in the coefficient of thermal expansion.

In FIG. 3, showing the difference at high temperatures, the center CL of the coil bobbin 11 is shifted Δs from the center CCL of the core 4.

In FIG. 4, showing the difference at normal temperature (15° to 20° C.), the center CL of the coil bobbin 11 corresponds to the center CCL of the core 4. Thus the coil bobbin 11 and the core 4 are in the neutral positions thereof.

In FIG. 5, showing the difference at low temperatures, the center CL of the coil bobbin 11 is shifted Δs from the center CCL of the core 4 in the direction opposite to that in the case of high temperatures.

The core 4 is shifted from the detecting coils 2a and 2b as described above.

Thus, if the number of wire turns in the detecting coil 2a is equal to that of wire turns in the detecting coil 2b, mechanical relative positional difference between the detecting coils 2a and 2b and the core 4 result. This leads the inductances $L_1$ and $L_2$ of the detecting coils 2a and 2b to vary with temperature as described above if no twisting torque acts on the input shaft 6. As a result, output voltage drifts, so that the steering torque sensor mistakenly considers steering torque to be applied to the input shaft 6.

To compensate an output voltage drift caused by mechanical relative positional difference between the detecting coils 2a and 2b and the core 4 due to temperature changes, the number of wire turns in the detecting coil 2a, for example, is set to N1+α, and that of wire turns in the detecting coil 2b is set to N1. Making settings this way allows an output voltage drift caused by mechanical relative positional difference between the detecting coils 2a and 2b and the core 4 to be compensated and significantly reduced.

In the steering torque sensor 1, therefore, compensation can be made for mechanical relative positional difference between the detecting coils 2a and 2b and the coil 4 due to temperature changes.

This minimizes a sensor output voltage drift, so that a sensor is provided which accompanies little output voltage drift attributable to temperature changes and which can stably detect steering torque with accuracy.

Figure 6:
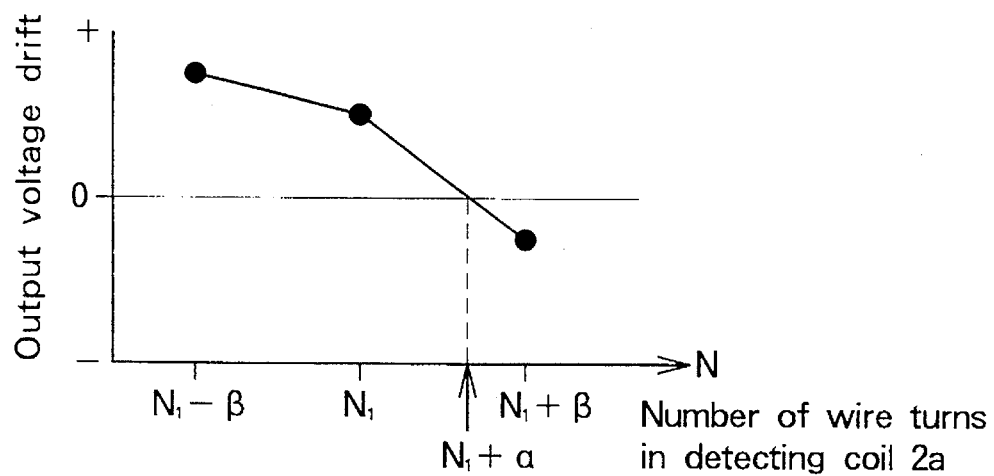
FIG. 6 is a graph showing the relationship between the number of wire turns in a detecting coil and an output voltage drift.

FIG. 6 is a graph showing the relationship between the detecting cores 2a and 2b and an output voltage drift, wherein the number of wire turns in the detecting coil 2a is taken as the abscissa and the output voltage drift is taken as the ordinate.

The graph shows the output voltage drift that occurs when N1, or the number of wire turns in the detecting coil 2b, is kept constant, and N, or the number of wire turns in the detecting coil 2a, is varied. It is understood from the graph that the output voltage drift is nullified when the number of wire turns in the detecting coil 2a is N1+α.

Figure 7:
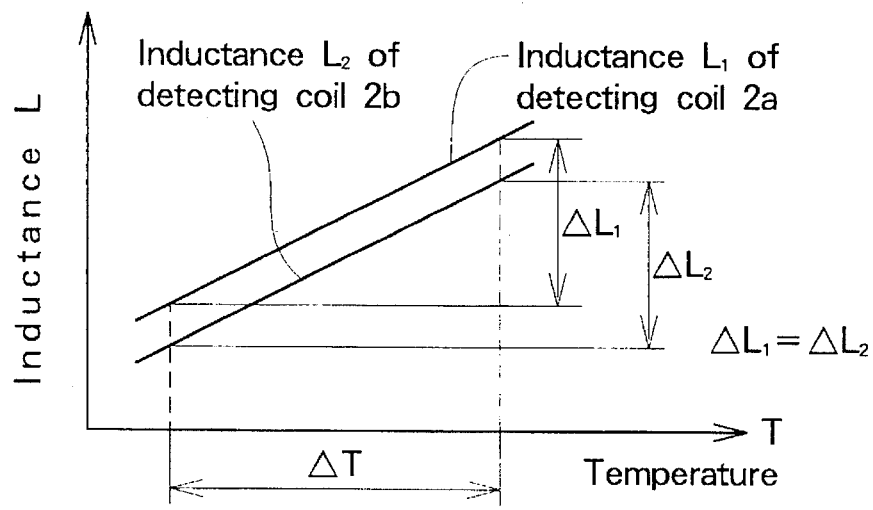
FIG. 7 is a graph showing the relationship between temperature and inductance, which relationship is observed when the number of wire turns in a detecting coil is varied.

FIG. 7 is a graph showing the relationships which are established between temperature T and the inductances $L_1$ and $L_2$ of the detecting coils 2a and 2b when the number of wire turns in the detecting coil 2a and that of wire turns in the detecting coil 2b are set to N1+α and N1, respectively, to arrange the steering torque sensor 1.

In FIG. 7, temperature (T) is taken as the abscissa, and inductance (L) is taken as the ordinate.

The graph shows that an increment in the inductance of the detecting coil 2a, ΔL1, and an increment in the inductance of the detecting coil 2b, ΔL2, are equal within a certain temperature range ΔT. When ΔL1=ΔL2, an output voltage drift due to a temperature change ideally approaches zero.

Figure 8:
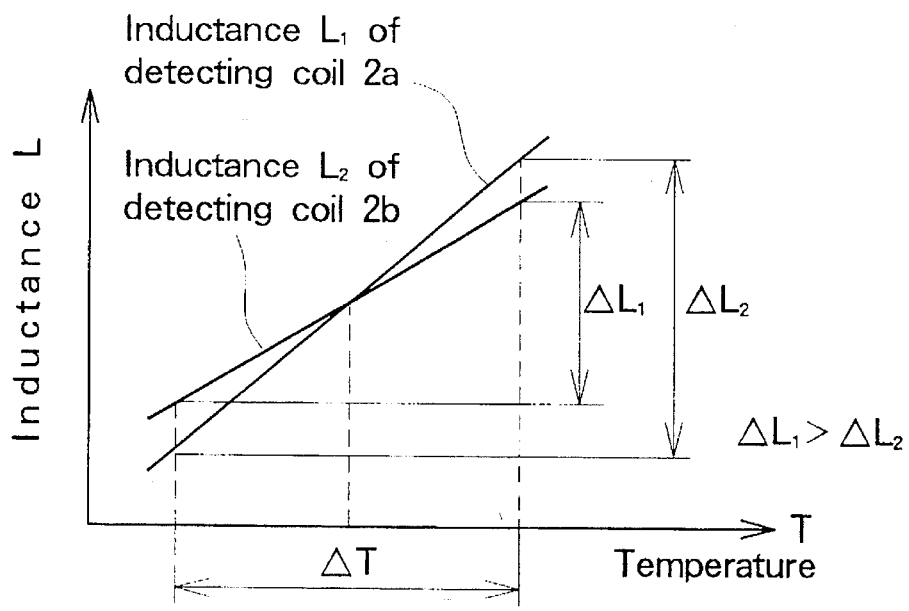
FIG. 8 is a graph showing the relationship between temperature and inductance, which relationship is observed when the number of wire turns in a detecting coil is varied.

FIG. 8 is a graph showing the relationships which are established between temperature T and the inductances $L_1$ and $L_2$ of the detecting coils 2a and 2b when the number of wire turns in the detecting coil 2a and that of wire turns in the detecting coil 2b are set to the same value to arrange the steering torque sensor 1.

In FIG. 8, temperature (T) is taken as the abscissa, and inductance (L) is taken as the ordinate. In the graph of FIG. 8, wherein the relationship which is established between temperature T and inductance L when the number of wire turns in the detecting coil 2a and that of wire turns in the detecting coil 2b are equal, an increment in the inductance of the detecting coil 2a, ΔL1, and an increment in the inductance of the detecting coil 2b, ΔL2, differ within a certain temperature range ΔT, the relationship between ΔL1 and ΔL2 being denoted by the inequality ΔL1>ΔL2.

Thus a temperature change causes the output from the steering torque sensor 1 to drift.

Figure 9:
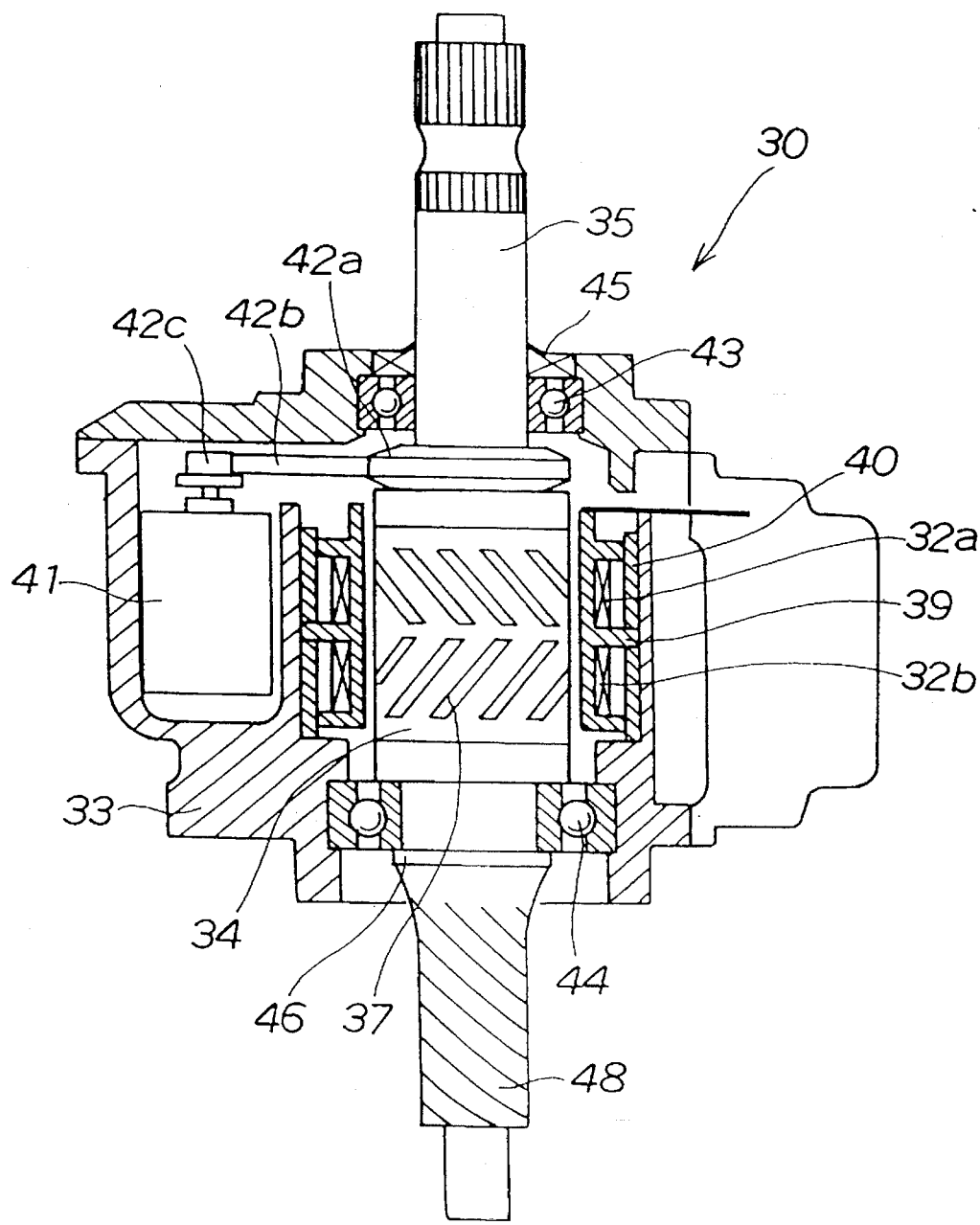
FIG. 9 is a longitudinal cross-sectional view of another steering torque sensor to which an arrangement for compensating the thermal characteristics of a sensor according to the present invention is applied.
Figure 10:
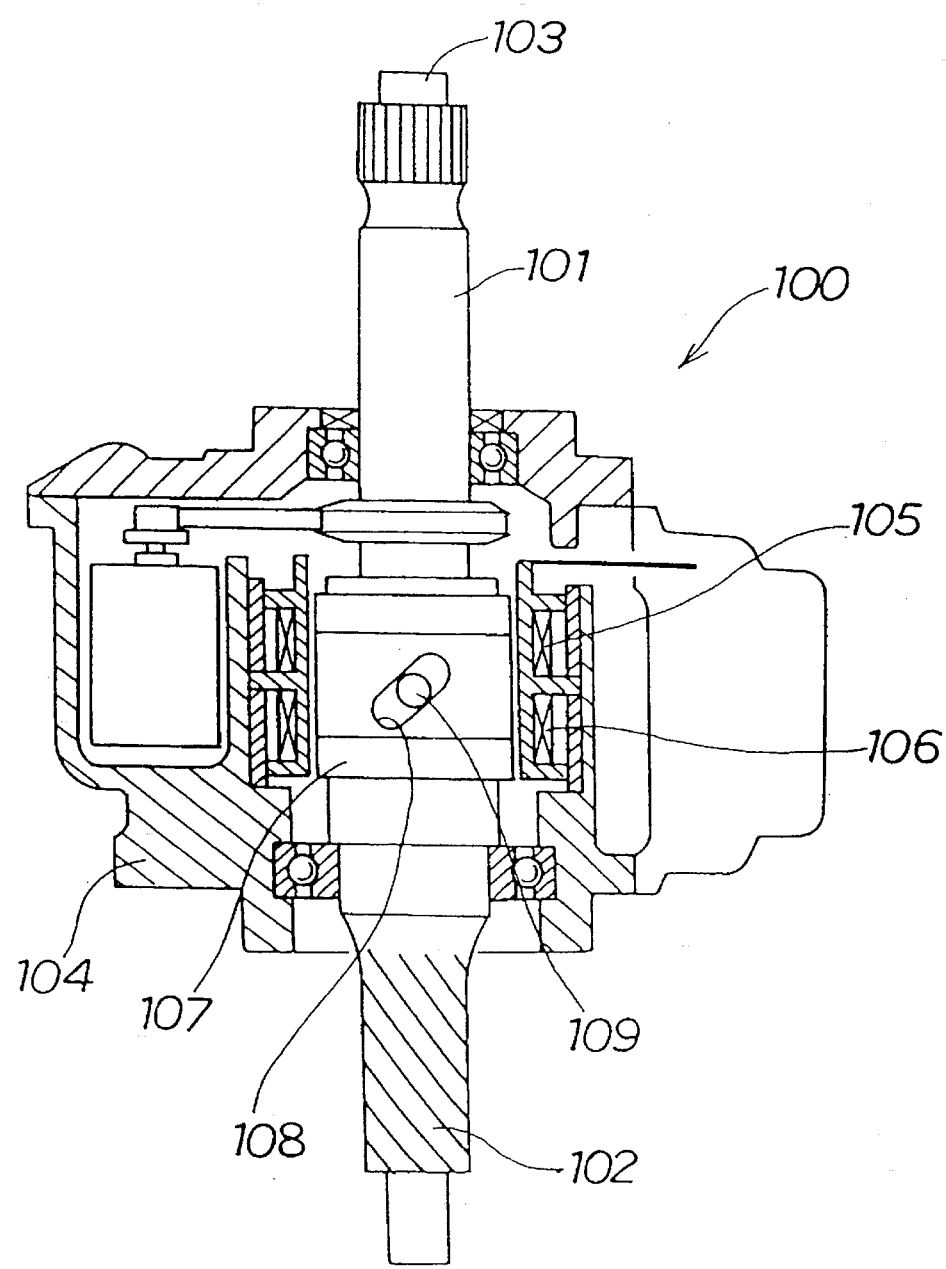
FIG. 10 is a longitudinal cross-sectional view of a steering torque sensor disclosed in Japanese Patent Application No. 130363/1994.

FIG. 9 shows another embodiment of a steering torque sensor according to the present invention.

A steering torque sensor 30 includes two detecting coils 32a and 32b, a housing 33 supporting the detecting coils 32a and 32b, and a thin amorphous strip 34, an equivalent to the core, which is provided in a circumferential segment, the thin amorphous strip 34 electromagnetically changing the detecting coils 32a and 32b. The steering torque sensor 30 further includes a shaft 35 provided with the thin amorphous strip 34, an equivalent to the input shaft, and a rectifier circuit outputting a change in the inductance of the detecting coils 32a and 32b as a change in a transient response voltage of an RL circuit.

The thin amorphous strip 34 is characterized in that the permeability thereof is increased when a tensile stress acts thereon, while it is reduced when a compression stress exerts thereon. A slit 37 is obliquely formed in the thin amorphous strip 34 so that compression and tensile stresses may readily occur when twisting torque acts on the shaft 35.

A housing 33, formed from aluminum, is arranged to support a coil bobbin 39, around which the detecting coils 32a and 32b are installed, via a yoke 40 and to surround the thin amorphous strip 34. Numeral 41 indicates a tachometer generator detecting the speed of rotation of the shaft 35 via a gear 42a, timing belt 42b, and a gear 42c; numerals 43 and 44, bearings installed between the shaft 35 and the housing 33; numeral 45, a dust seal; numeral 46, a clamp ring; and numeral 48, a shaft equivalent to the output shaft.

The number of wire turns in the detecting coil 32a and that of wire turns in the detecting coil 32b are set different, for example, the former being N2+α and the latter being N2.

In the steering torque sensor 30, compression and tensile stresses take place in the thin amorphous strip 34 when twisting torque acts on the shaft 35. As a result, the permeability of the thin amorphous strip 34 changes, leading to a change in magnetic flux density near the detecting coils 32a and 32b. Thus the inductance $L_1$ of the detecting coil 32a and the inductance $L_2$ of the detecting coil 32b vary. The inductance change can be detected as a change in steering torque by the rectifier circuit. In the steering torque sensor 30, mechanical positional difference between the detecting coils 32a and 32b and the thin amorphous strip 34 occur because materials from which the detecting coils 32a and 32b, the housing 33, the thin amorphous strip 34, the coil bobbin 39, and other components are formed differ in the coefficient of thermal expansion.

Thus, if the number of wire turns in the detecting coil 32a is equal to that of wire turns in the detecting coil 32b, mechanical relative positional difference between the detecting coils 32a and 32b and the thin amorphous strip 34 result. This leads the inductances $L_1$ and $L_2$ of the detecting coils 32a and 32b to vary if no twisting torque acts on the shaft 35. As a result, output voltage drifts, so that the steering torque sensor 30 mistakenly considers steering torque to be applied to the shaft 35.

On the other hand, according to the present invention, the number of wire turns in the detecting coil 32a and that of wire turns in the detecting coil 32b are set to two different values, that is, N2+α and N2, respectively, so that a change in the inductance L1 of the detecting coil 32a and a change in the inductance L2 of the detecting coil 32b may differ. This leads output voltage to drift due to a change in the temperature of the detecting coils 32a and 32b only.

To compensate an output voltage drift caused by mechanical relative positional difference between the detecting coils 32a and 32b and the thin amorphous strip 34 due to a temperature change, the number of wire turns in the detecting coil 32a and that of wire turns in the detecting coil 32b are set to, for example, N2+α and N2, respectively. Making settings this way allows an output voltage drift caused by mechanical relative positional difference between the detecting coils 32a and 32b and the thin amorphous strip 34 to be compensated and significantly reduced.

In the steering torque sensor 30, therefore, compensation can be made for mechanical relative positional difference between the detecting coils 32a and 32b and the coil 4 due to thermal characteristics and magnetic resistance changes (changes in permeability and eddy current loss) in the vicinity of the detecting coils.

This minimizes a sensor output voltage drift, so that a sensor is provided which accompanies little output voltage drift attributable to a temperature change and which can stably detect steering torque with accuracy.

As in the case of the relationships between the numbers of wire turns in the detecting coils 2a and 2b and the output voltage drift shown in the graph of FIG. 6, if the number of wire turns in the detecting coil 32b is set to N2 (constant), and the number of wire turns in the detecting coil 32a, N, is varied, the output voltage drift is nullified when N=N2+α.

The relationships which are established between temperature T and the inductances $L_1$ and $L_2$ of the detecting coils 32a and 32b when the number of wire turns in the detecting coil 32a and that of wire turns in the detecting coil 32b are set to N2+α and N2, respectively, to arrange the steering torque sensor 30 are the same as shown by the graph of FIG. 7.

An increment in the inductance of the detecting coil 32a, ΔL1, and an increment in the inductance of the detecting coil 32b, ΔL2, are equal within a certain temperature range ΔT. When ΔL1=ΔL2, an output voltage drift due to a temperature change ideally approaches zero.

As shown in the graph of FIG. 8, the relationship which is established between temperature T and inductance L when the number of wire turns in the detecting coil 32a and that of wire turns in the detecting coil 32b are equal to arrange the steering torque sensor 30, an increment in the inductance of the detecting coil 32a, ΔL1, and an increment in the inductance of the detecting coil 32b, ΔL2, differ within a certain temperature range ΔT (ΔL1>ΔL2).

Thus a temperature change causes the output from the steering torque sensor 30 to drift.

According to the present invention described above, the numbers of wire turns in two detecting coils can be set different to unbalance the thermal characteristics of the detecting coils, and, on the other hand, the number of wire turns in one of the two detecting coils can be increased or reduced to adjust the direction and the level of an output voltage drift. The thermal characteristics of a sensor can be compensated by setting an electrical deviation so that the deviation and mechanical difference due to a temperature change are compensated.

Thus a sensor according to the present invention provides a stable, highly accurate steering torque sensor for electrically powered steering systems, which commits few errors. A simple arrangement in which different numbers of wire turns in two detecting coils can make the above-described advantages a reality.

According to the present invention set forth hereinabove, a change in the inductance of two coils is detected using a transient response voltage corresponding to that change; the present invention can also be applied to a differential transformer type sensor detecting an impedance change thus far used by conventional sensors as a differential voltage change.

We claim:

1. An arrangement for compensating the thermal characteristics of a sensor including a core movable from a neutral position in two directions along a line and two detecting coils disposed symmetrically along said line with said neutral position placed at the center of symmetry, in which sensor a change in the inductance of said two detecting coils due to the movement thereof is electrically detected, the arrangement being adapted so that the numbers of wire turns in said two detecting coils are set different to compensate a change in the mechanical thermal characteristics of said sensor.

2. The arrangement for compensating the thermal characteristics of a sensor according to claim 1, wherein said core is axially movable, and said two detecting coils are axially fixed and axially and symmetrically disposed in series with each other.

3. An arrangement for compensating the thermal characteristics of a torque sensor wherein a torsion bar is used to connect an input shaft and an output shaft together, a core which is moved by torque acting on said input shaft and said output shaft is fitted over said input shaft and said output shaft, two detecting coils are disposed symmetrically with the a neutral position placed at the center of symmetry, a change in the inductance of said two detecting coils due to the movement thereof is electrically detected, said arrangement being adapted so that the numbers of wire turns in said two detecting coils are set different to compensate a mechanically produced change in the thermal characteristics of said torque sensor.

4. The arrangement for compensating the thermal characteristics of a torque sensor according to claim 3, wherein said torque sensor is a steering torque sensor for an electrically powered steering system.

5. The arrangement for compensating the thermal characteristics of a torque sensor according to claim 3 or claim 4, wherein said core twists an output shaft via a torsion bar when steering torque is input to an input shaft, and twisting torque is converted via said input shaft and said output shaft to the axial movement of said core.

6. An arrangement for compensating the thermal characteristics of a torque sensor wherein a magnetic member whose magnetic characteristics change under the action of torque is provided over a rotating shaft, two detecting coils are placed near said rotating shaft, and a change in the inductance of said two detecting coils due to said magnetic member electromagnetically changing is electrically detected, the arrangement being adapted so that said two detecting coils with different numbers of wire turns therein compensate a mechanically produced change in the thermal characteristics of said torque sensor.

7. The arrangement for compensating the thermal characteristics of a torque sensor according to claim 6, wherein said magnetic member whose magnetic characteristics are changed is a thin amorphous strip provided over a core which is fitted over an input and an output shaft acted on by said torque to be axially movable.

8. The arrangement for compensating the thermal characteristics of a torque sensor according to claim 7, wherein said thin amorphous strip is provided with an oblique slit.

* * * * *